UNITED STATES PATENT OFFICE.

JACOB BARAB, OF DOVER, NEW JERSEY, ASSIGNOR TO HERCULES POWDER COMPANY, OF WILMINGTON, DELAWARE, A CORPORATION OF DELAWARE.

PROCESS OF SEPARATING NUT-SHELLS FROM ADHERENT MEATS.

1,280,634.      Specification of Letters Patent.      Patented Oct. 8, 1918.

No Drawing.      Application filed July 11, 1918. Serial No. 244,425.

*To all whom it may concern:*

Be it known that I, JACOB BARAB, a citizen of the United States, residing at Dover, county of Morris, and State of New Jersey, have invented a new and useful Improvement in Processes of Separating Nut-Shells from Adherent Meats.

In the manufacture of dynamite, the use of the shells of nuts, in more or less finely ground form, as an absorbent or carrier for the nitroglycerin has been suggested, but more or less difficulty has been experienced in separating the shells from the meats adherent thereto. In the first instance, the larger part of the meats are removed from the shells by manufacturers of food products, who dispose of the shells to the explosives manufacturer. The shells thus received by the explosives manufacturer have more or less meat adherent thereto, and these should be completely and thoroughly removed before the shells are fit for use, as the presence in the explosives of any meaty particles or vegetable oil derived therefrom may cause serious deterioration of the explosive. Further, the presence of meats makes grinding and sieving of ground shells very difficult, and in fact almost impossible under ordinary conditions. Efforts to effect this thorough and complete separation have not been heretofore effective. For example, I have immersed the shells in water or in brine (dependent upon the specific gravity of the particular shells being treated), accompanied by more or less agitation, until the detachment of the meats from the shells is effected, after which the shells are allowed to sink by gravity, the meats rising to and floating on the surface. This method of operation is, however, not efficient, and is particularly unsatisfactory as applied to shells of certain nuts, such as walnuts and pecans.

In the case of pecans, in which the adhesive force between the shells and meats is particularly strong, the process is practically inoperative, whatever liquid may be used, in that a certain proportion of meats adhere to the shells after the most prolonged soaking and agitation, while the difference in the specific gravities of the meats and shells is not sufficient to effect a separation between the meats and the imperfectly cleaned shells. For this reason, the use of the shells of certain nuts, such as pecans, has been deemed to be impracticable, there being no other known method of effecting separation.

I have discovered that the separation of these shells may be effected in certain liquids provided the liquid is heated to a temperature rather closely approximating its boiling point. In the case of pecans, the separation may be effected in plain water. I prefer a temperature of about 90 degrees C., although good results have been secured by heating the water to as low as 60 degrees C., the lower temperature, however, much prolonging the operation. The success of the separation is dependent, apparently, less upon the direct effect of the heat than upon the change produced by the water in the absolute and relative apparent densities of the shells and meats.

The pecan shells to be cleaned and separated are immersed in a suitable vessel containing water which has been heated to the temperature above specified; or the water may be heated after the shells are immersed. Some agitation is advisable. The meats detach themselves wholly from the shells and chaff and float to the surface, the shells sinking to the bottom. The meats are skimmed off and are a valuable by-product, being convertible into oil. While some fine shell particles adhere to the meats no meats adhere to the shells, the latter being in condition, after being dried, without further treatment, to be ground for use as an explosive carrier or absorbent.

The use of pure water as the liquid "separant" is not imperative, and for certain nut shells a weak brine solution may be preferred, the selection of the proper liquid solution depending upon the desired specific gravity of the liquid for the particular variety of shells to be treated. With pecan shells, however, excellent results are obtained by the use of water alone, and the use of water, rather than some less readily available liquid, is, of course, preferable in those cases where it is found efficient.

The treatment of walnut shells is not herein specifically described, as the same forms the subject-matter of a separate application. Features common to both processes, and features specific to the treatment of pecan shells, are herein claimed, the specific process for treating walnut shells forming the subject-matter of a separate application, Serial No. 244,426 filed of even date herewith.

Having now fully described my invention, what I claim and desire to protect by Letters Patent is:

1. The process of separating nut shells from meats which comprises treating them in a liquid heated to a temperature not less than sixty degrees centigrade.

2. The process of separating nut shells from meats which comprises treating them in a liquid heated to a temperature approximating its boiling point.

3. The process of separating nut shells from meats which comprises treating them in water heated to a temperature not less than sixty degrees centigrade.

4. The process of separating nut shells from meats which comprises treating them in water heated to a temperature approximating its boiling point.

5. The process of separating nut shells from meats which comprises treating them in a liquid heated to a temperature not less than sixty degrees centigrade until the detachment of the meats from the shells is substantially complete, the liquid having a specific gravity between the specific gravities of the liquid-soaked meats and shells, and allowing the meats to float and the shells to sink.

6. The process of separating nut shells from meats which comprises treating them in a liquid heated to a temperature approximating its boiling point until the detachment of the meats from the shells is substantially complete, and allowing the constituents to separate in a liquid medium by gravity.

7. The process of separating nut shells from meats which comprises treating them in water heated to a temperature not less than sixty degrees centigrade until the detachment of the meats from the shells is substantially complete, and allowing the cleaned shells and detached meats to separate in the water by gravity.

8. The process of separating nut shells from meats which comprises treating them in water heated to a temperature approximating its boiling point, and allowing the cleaned shells to sink and the water soaked detached meats to float.

In testimony of which invention, I have hereunto set my hand, at Kenvil, N. J., on this 3rd day of July, 1918.

JACOB BARAB.